Figure 1A:
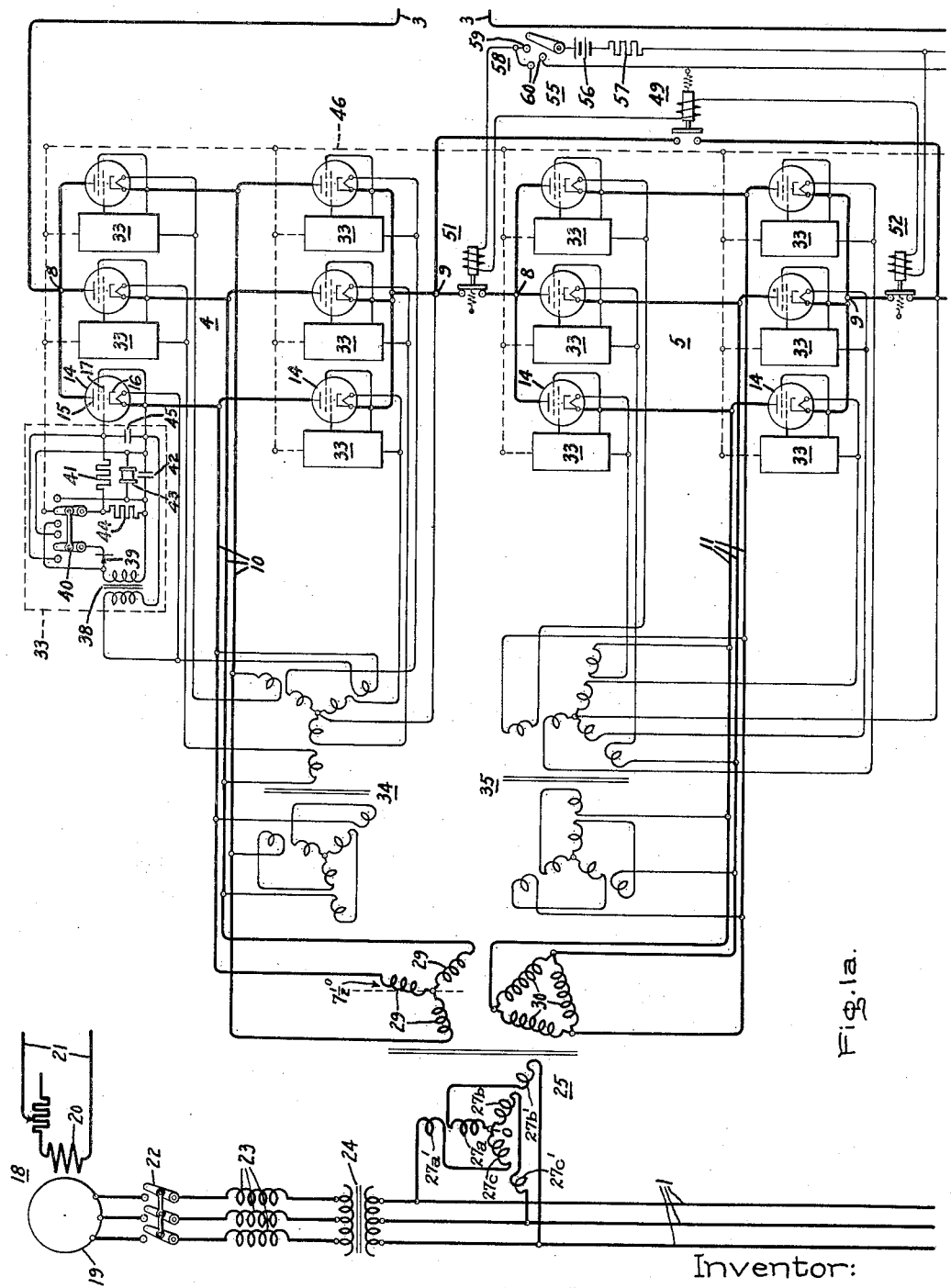

Inventor:
Ernst F. W. Alexanderson,
by Harry E. Dunham
His Attorney.

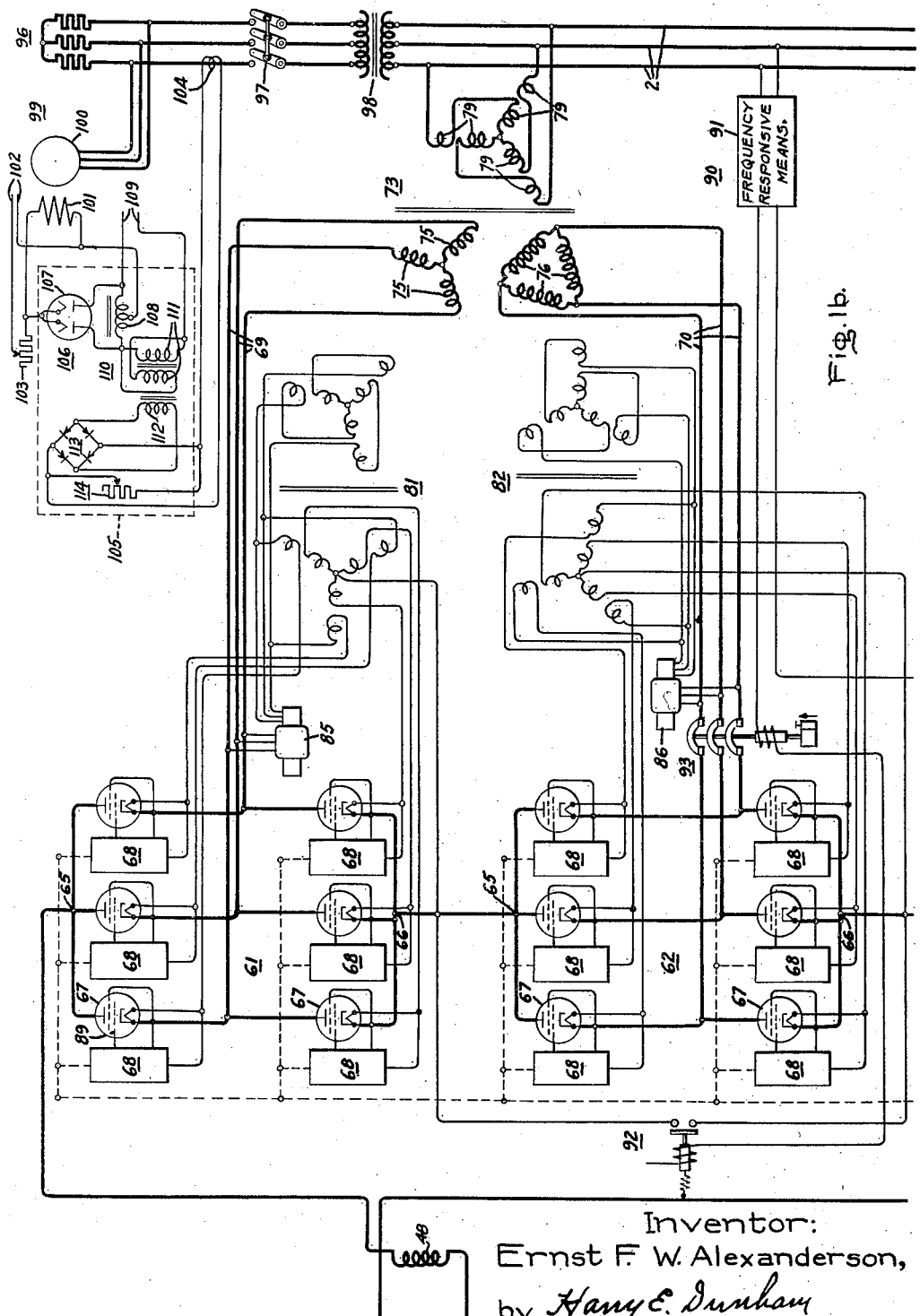

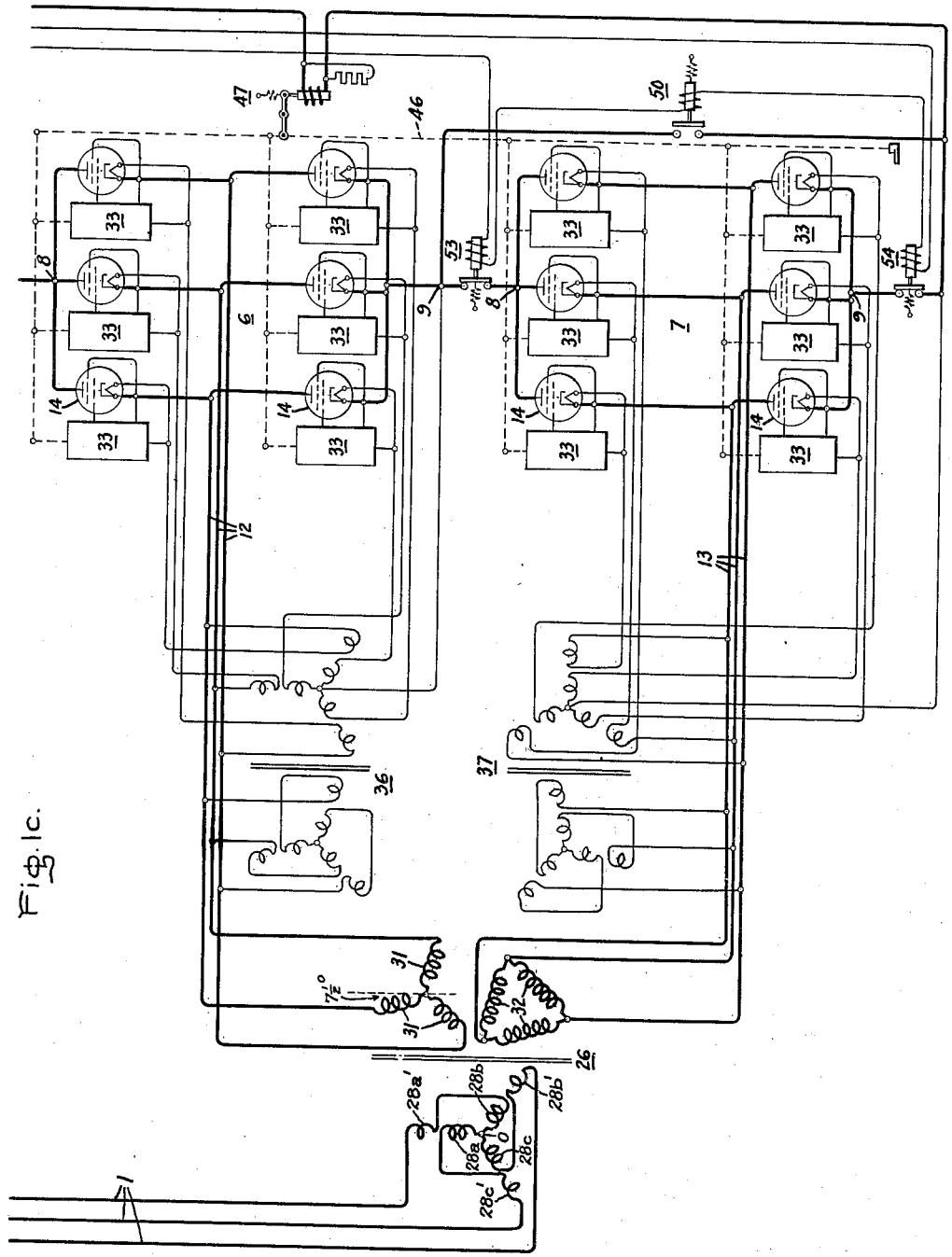

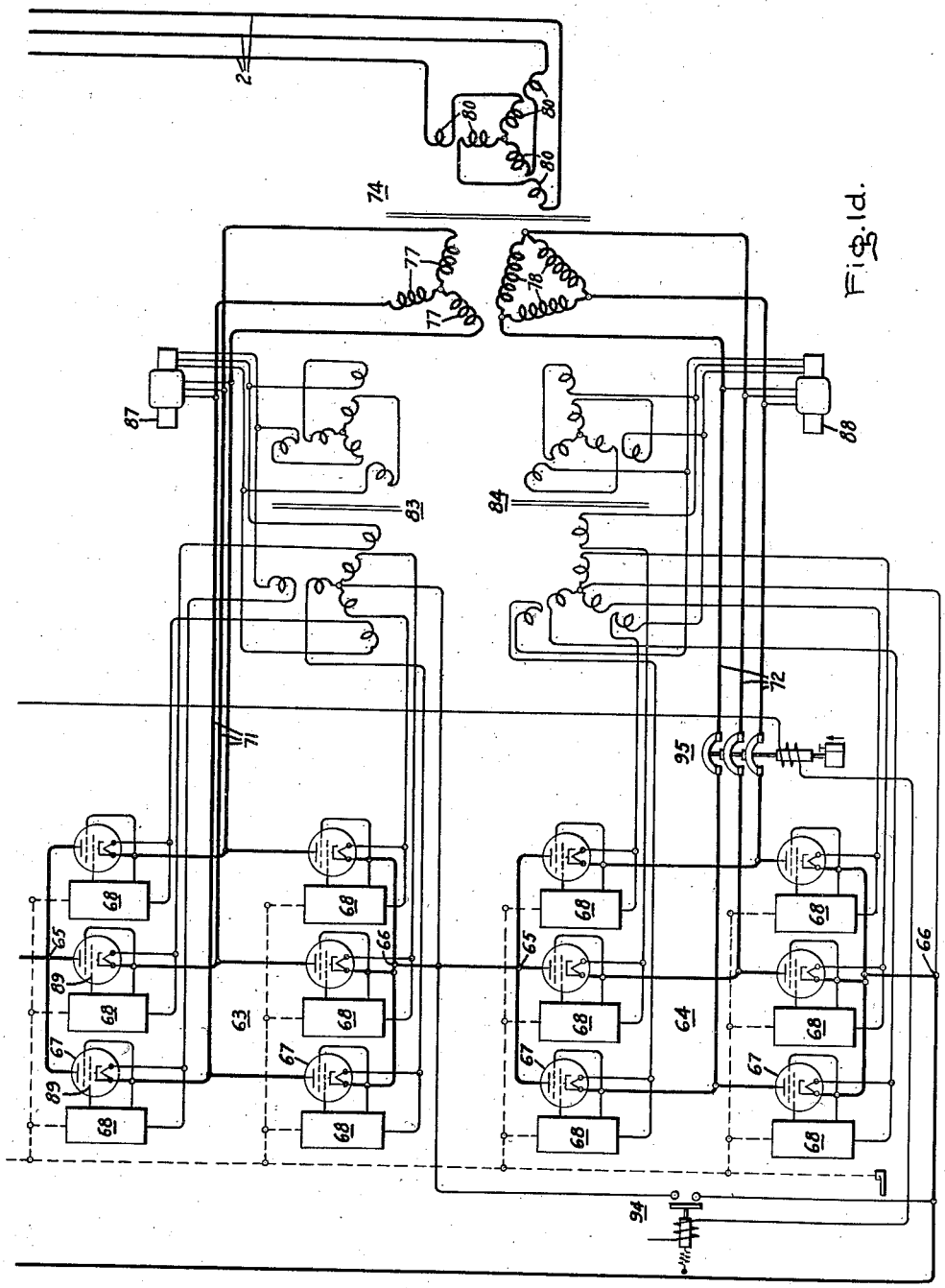

Patented Apr. 29, 1941

2,240,201

UNITED STATES PATENT OFFICE 2,240,201

ELECTRIC TRANSFORMING APPARATUS

Ernst F. W. Alexanderson, Schenectady, N. Y., assignor to General Electric Company, a corporation of New York Original application November 5, 1938, Serial No. 239,159. Divided and this application March 1, 1940, Serial No. 321,713

4 Claims. (Cl. 172—233)

My invention relates to electric apparatus for transmitting power between alternating current circuits and direct current circuits, and relates more particularly to electric networks or transformers for supplying polyphase systems of voltages to electric valve translating apparatus.

This application is a division of my copending application Serial No. 239,159, filed November 5, 1938, entitled "Electric power transmission system," patented July 16, 1940, No. 2,208,183.

There has been evidenced a decided need for improved electric power apparatus for use in conjunction with electric valve translating equipment whereby polyphase systems of voltages may be provided without involving apparatus of inordinate complexity and size. In accordance with the teachings of my invention described hereinafter, I provide new and improved inductive network or transformer equipment for use in interconnecting direct current and alternating current circuits through electric valve translating apparatus.

It is an object of my invention to provide new and improved transforming equipment for changing polyphase alternating current into alternating current of a greater number of phases, or vice versa.

It is another object of my invention to provide transforming equipment which transforms three phase alternating current into twenty-four phase alternating current, or vice versa.

It is a further object of my invention to provide new and improved transforming equipment for transforming three phase alternating current into twelve phase alternating current.

Briefly stated, in the illustrated embodiment of my invention I provide new and improved electric power transforming apparatus which may be used in conjunction with electric valve equipment for transforming three phase alternating current into twelve phase or twenty-four phase alternating current. Where transformation between three phase and twenty-four phase current is desired, I provide a pair of transformers each having two groups of primary windings arranged in a relationship described hereinafter and each having two sets of secondary windings, one set of which is connected in a star arrangement and the other set of which is connected in a mesh arrangement.

For a better understanding of my invention, reference may be had to the following description taken in connection with the accompanying drawings, and its scope will be pointed out in the appended claims. Figs. 1a, 1b, 1c and 1d, considered jointly, represent an embodiment of my invention as applied to an electric valve power transmission system for interconnecting two alternating current systems through a direct current transmission line. Certain features of the transmission system are disclosed and claimed in my above-identified copending application.

Referring now to Figs. 1a–1d, which together constitute a complete transmission system, I have shown my invention as applied to a high voltage, direct current electric power transmission system for transmitting power between a constant voltage, alternating current circuit 1 and a constant voltage, alternating current circuit 2 through a direct current transmission line 3. It is to be understood that the arrangement illustrated in Figs. 1a–1d is capable of transmitting power between the alternating current circuits 1 and 2, and for the purpose of explaining the system, that translating apparatus associated with circuit 1 will be considered as the transmitting station, and the translating apparatus associated with the receiving apparatus will be considered as the receiving station. At the transmitting station, I provide a plurality of serially connected electric valve rectifiers 4—7, each having direct current terminals 8 and 9 and each being energized from alternating current circuits 10, 11, 12 and 13, respectively. Each of the electric valve rectifiers 4—7 comprises a plurality of electric valve means 14 which are preferably of the type employing an ionizable medium, such as a gas or a vapor, and each of which comprises an anode 15, a cathode 16 and a control member or grid 17 which controls the conductivity thereof.

The alternating current circuit 1 may be energized from any suitable source, such as a dynamo-electric machine 18 which may be of the synchronous type comprising an armature member 19 and a field winding 20 which is energized from a suitable source of direct current 21. A switch 22 and air core reactances 23 may be connected between the armature 19 and the transmitting station. A step-up transformer 24 may be interposed between the machine 18 and the translating apparatus if an increased voltage is desired.

To transform polyphase alternating current, such as three phase alternating current, into twelve phase or twenty-four phase alternating current, I provide transformers 25 and 26 having primary windings 27, 28 and secondary windings 29, 30 and 31, 32, respectively.

Each of the transforming means or transformers 25 and 26 comprises two groups of primary windings connected in an arrangement described more particularly hereinafter, and each of the transformers comprises two groups or sets of secondary windings, one of which is connected in a star or Y connection and the other of which is connected in a mesh or delta connection. For example, considering transformer 25 more particularly, this transforming means comprises one set of primary windings 27a, 27b and 27c which are connected in a Y relationship and also includes a second group of primary windings 27a', 27b' and 27c' which are connected in series relation with different combinations or pairs of phase windings of the first group to effect a phase displacement between the voltages induced in the star connected and the mesh connected secondary windings 29 and 30. The windings 27a', 27b' and 27c' are connected in a zigzag relationship to produce the phase displacement of the secondary voltages induced in windings 29 and 30. It is to be understood that the geometrical displacement of the secondary windings 29 and 30 on the drawings is intended to show the phase displacement of the voltages produced thereby with respect to the polyphase system of voltages of circuit 1. That is, the vertical dotted line associated with the group of secondary windings 29 is connected to represent a voltage axis of the three phase system of voltages of circuit 1. Consequently, the geometrical position of the secondary windings 29 and 30 indicates the phase displacement of the secondary voltages of these windings with respect to the voltages of circuit 1. Of course, it is to be understood that the transformer 25 comprises groups of windings mounted on the same portions of the associated core structure. For example, the upper secondary winding 29 would be wound on the same portion of the magnetic core structure as windings 27a and 27a'. In like manner, the lower right-hand secondary winding 29 and the lower left-hand secondary winding 29 would be wound on the same portion of the core structure as windings 27b, 27b', 27c and 27c', respectively. The amount of phase shift or phase displacement of the resultant secondary voltages induced in secondary windings 29 and 30 is determined by the number of turns of the windings 27a', 27b' and 27c' relative to the number of turns of windings 27a, 27b and 27c.

In like manner, the transforming means 26 is also arranged to have two sets of primary windings 28a, 28b and 28c which are connected in star relationship. The second set of primary windings 28a', 28b' and 28c' are also connected in series relation with different pairs or combinations of phase windings of the first group to effect a phase displacement between the voltages induced in the star connected and the mesh connected secondary windings 31 and 32, thereby producing a six phase system of voltages which in conjunction with the electric valve means 6 and 7 cause the electric valve means to operate as a twelve phase system.

In order to provide a twenty-four phase system of voltages which are symmetrical, I connect the primary windings of transformers 25 and 26 relative to the polyphase alternating current circuit 1 so that the respective twelve phase system of voltages produced by transformers 25 and 26 are displaced with respect to each other by fifteen electrical degrees. This phase displacement is effected by the manner in which the respective pairs of groups of primary windings are connected with respect to each other and with respect to the alternating current circuit 1. For example, it will be noted that winding 27a' is connected in series relation with windings 27c, 27b and 27c', whereas winding 28a' is connected in series relation with windings 28b, 28a and 28c' thereby effecting the desired phase displacement of the voltage induced in the secondary windings of these transforming means.

It is to be noted that I may employ a plurality of groups of serially-connected electric valve rectifiers. That is, each group may include a number of arrangements such as rectifiers 4—7, all of which may be connected in series relation with each other.

I provide a plurality of control excitation circuits 33 each associated with a different one of the electric valve means 14 in electric valve rectifiers 4—7. These excitation circuits serve as arrangements for controlling the conductivities of the electric valves 14. The excitation circuits of electric valve rectifiers 4—7 are energized from transformers 34—37, respectively. It will be noted that the transformers 34—37 also supply energy to the cathode heating elements of the electric valves 14 in the electric valve rectifiers 4—7. The excitation circuits 33 may be of any conventional type well known in the art, and for the purpose of illustrating my invention I have shown the excitation circuits 33 as being of the type disclosed and claimed in United States Letters Patent 2,114,828 granted April 19, 1938, upon an application of B. D. Bedford and assigned to the assignee of the present application. Each of the excitation circuits 33 comprises a transformer 38 energized from a suitable phase of the associated transformers 34—37, and a unidirectional conducting device such as a contact rectifier 39 which is arranged to be connected in series relation with the control grid 17 of the associated electric valve 14. A suitable switch 40 may be connected between the unidirectional conducting device 39 and the grid 17 to impress upon the control grid 17 a negative unidirectional biasing potential which renders the valve 14 nonconductive when transformer 38 is not directly connected to grid 17. A resistance 41 is arranged to be connected across the unidirectional conducting device 39 when the switch 40 is in the left-hand position to afford a path for the grid current in the event the unidirectional conducting device 39 becomes defective. This arrangement of the parallel connected resistance 41 and the rectifier 39 affords a relatively low impedance path to the flow of normal grid current and offers a relatively great impedance to the flow of "positive ion" current. To impress on the control grid 17 a negative unidirectional biasing potential, I employ a parallel connected capacitance 42 and a resistance 43. A resistance 44 may be connected in series relation with resistance 41. Resistance 43 may be of the type having a nonlinear impedance current characteristic, if desired. When the switch 40 is in the left-hand position, the electric valve 14 is rendered conductive periodically by the voltage supplied by transformer 38. When the switch 40 is in the right-hand position, the electric valve 14 is maintained nonconductive by the negative unidirectional biasing potential appearing across the terminals of capacitance 42. Capacitance 45 is connected across the grid 17 and cathode 16 to absorb extraneous voltages. The switches 40 of the excitation circuits 33 may be interconnected by means of the gang controller 46. The controller 46 may be actuated by a suitable overload protective means, such as a current responsive relay 47 which automatically throws the switches 40 to the right-hand position to render the electric valve means nonconductive in the event of overload. A suitable inductive reactance 48 may be connected in series relation with the direct current circuit 3.

In order to control the power level at which power is transmitted over the direct current circuit 3, I provide means for controlling the individual electric valve rectifiers 4—7. For example, I provide switches 49 and 50 associated with electric valve rectifiers 5 and 7, respectively, for short circuiting the direct current terminals 8 and 9 to render the electric valves selectively operative and inoperative. As a means for isolating the electric valve rectifiers, I also employ switches 51, 52 and 53, 54 associated with electric valve rectifiers 5 and 7, respectively. The rectifiers 4—7 are arranged to transmit a predetermined amount of power; that is, each is designed to transmit power at different voltages depending upon the voltage of circuit 1. In the event the power demanded by the system decreases, certain of the electric valve rectifiers may be disconnected from the transmitting station to decrease the power level. In order to disconnect certain predetermined rectifying units or groups, I provide a circuit 55 for energizing the actuating coils of switches 49—54. Circuit 55 may comprise a suitable source of current, such as a battery 56, a current limiting resistance 57 and a switch 58 having contacts 59 and 60. Switch 58 may be controlled in accordance with a predetermined controlling influence, such as the amount of power transmitted by the direct current circuit 3 to control the number of rectifying units operatively connected at the transmitting station. The rectifying units 5—7 may be selectively connected and disconnected in order to maintain the direct current transmitted at a substantially constant value or within a predetermined range of values in accordance with the power demanded by the system. Switch 58 may be automatically operated in response to a predetermined controlling influence, such as the power or the current of the direct current circuit 3, in order to obtain this type of control. When contact 59 is engaged, the rectifying unit 5 is rendered inoperative and when contacts 60 are engaged, rectifying units 5 and 7 are rendered inoperative effecting corresponding decreases in the power level at which power is transmitted. Switches 51—54 are arranged to open with a predetermined time delay. Since the actuating coils of the switches for each rectifying unit are energized in series relation, it is desirable to effect closure of switches 49 and 50 prior to the opening of the associated switches 51, 52 and 53, 54 respectively.

At the receiving station associated with the alternating current circuit 2, I provide a plurality of serially connected inverting circuits or units 61—64 each having direct current terminals 65 and 66. The inverting units 61—64 are connected in series relation with each other and are connected to be energized from the direct current circuit 3. Each of the inverting units 61—64 comprises a plurality of electric valve means 67 which are also preferably of the type employing an ionizable medium, such as a gas or a vapor, and each is controlled by means of an associated control or excitation circuit 68 which may be the same as excitation circuits 33 described above. The excitation circuits 68 at the receiving station may also be operated by a gang controller to render the electric valves 67 nonconductive when desired. The electric valve inverters 61—64 are connected to the alternating current circuit 2 through alternating current circuits 69—72, respectively. Transformers 73 and 74 are connected between circuits 69—72 and alternating current circuit 2 and are provided with primary windings 75, 76; 77, 78 and secondary windings 79 and 80, respectively, connected in a manner similar to transformers 25 and 26. The windings of the transformers 73 and 74 may also be arranged in a twenty-four phase relationship in order that the alternating current transmitted to the circuit 2 is of suitable wave form. When the system is operating to transmit power at different predetermined current levels or within different ranges of current, the electric valve inverters 62 and 64 may be selectively connected and disconnected to energize selectively primary windings 76 and 78, respectively, to transmit power to circuit 2 at substantially constant voltage, or within predetermined ranges of voltage, by controlling the resultant ampere-turns or the resultant magnetic field linking secondary windings 79 and 80 of transformers 73 and 74, respectively. The broad feature of transmitting power between constant current, direct current circuits and constant voltage, alternating current circuits by arrangements of this nature is disclosed and claimed in a copending patent application Serial No. 239,061 of Frank R. Elder, filed November 5, 1938 and assigned to the assignee of the present application. Excitation circuits 68 and the cathode heating elements for the electric valves 67 are energized from transformers 81, 82, 83 and 84. Suitable phase shifting devices, such as rotary phase shifters 85—88, are interposed between transformers 81—84 and circuits 69—72 to provide means for controlling the phase of the voltages impressed on the control grids 89 of electric valves 67 and to provide thereby means for controlling and adjusting the amount of power transmitted to the alternating current circuit 2.

To control the amount of power transmitted to the alternating current circuit 2 at the different predetermined power levels demanded by the receiving station, I provide a circuit 90 comprising a frequency responsive means 91 which selectively connects and disconnects predetermined electric valve inverters in the system. For example, the electric valve inverter 62 is provided with a short circuiting or shunting switch 92 and an alternating current isolating switch 93, and the electric valve inverter 64 is provided with a short circuiting switch 94 and an alternating current isolating switch 95. The frequency responsive means 91 may be any suitable arrangement for effecting selective operation of the switches 92—95 under varying load conditions. For example, as the load increases, the frequency responsive means connects the inverter 62 operatively in the system and if the load increases still further connects the inverter 64 operatively in the system. Of course, as the load decreases the reverse operation is followed.

The load to which the circuit 2 is connected may be represented by circuit 96. A suitable switch 97 and a step-down transformer 98 may be connected between circuit 2 and the load 96, if desired.

As a means for supplementing the inverters 61—64 in the maintenance of the voltage and the frequency of the alternating current circuit 2 substantially constant under varying load conditions, I provide a synchronous dynamo-electric machine 99 having an armature member 100 and a field winding 101. The field winding 101 may be energized from any suitable source of direct current 102 through a current controlling means, such as an adjustable resistor or rheostat 103. In order to maintain the voltage and the frequency of the alternating current circuit 2 substantially constant in a system of this nature, it is important to vary or control the excitation of the synchronous machine 99 in response to the amount of load transmitted. That is, it is necessary to introduce into the circuit for the field winding 101 a component of unidirectional current which varies in accordance with or in response to the load current transmitted. To accomplish this control, I provide a current transformer 104 which furnishes an alternating current which varies in accordance with the load transmitted. Current transformer 104 energizes a load compensating device 105 which transmits variable amounts of unidirectional current to the field winding 101 to control the voltage and the frequency of the synchronous machine 99. The load compensating device 105 may comprise a rectifier 106 which may include a full wave electronic device 107 and a transformer 108 which are energized from any suitable source of alternating current 109. The anode-cathode voltage applied to the electronic discharge device 107 is controlled by means of a saturable reactor 110 having windings 111 connected in series relation with the transformer 108 and the source of alternating current 109. The saturable reactor 110 is also provided with a control winding 112 which is energized by variable amounts of unidirectional current from a full wave rectifier 113 which in turn is energized by the current transformer 104. A suitable current controlling device, such as an adjustable resistance 114 may be connected across rectifier 113.

The operation of the embodiment of my invention diagrammatically illustrated in Figs. 1a–1d will be explained by considering the system when it is operating to transmit power from the alternating current circuit 1 to the alternating current circuit 2 over the direct current transmission line 3. In this embodiment of my invention, power is transmitted at different predetermined values of voltage of the direct current circuit 3 or may be transmitted at different values or ranges of current and the amount of power transmitted is controlled by the number of transmitting and receiving units operatively connected to the direct current circuit 3. For example, the individual electric valve rectifying circuits or units 4–7 may be designed to supply a predetermined terminal voltage, such as 10,000 volts. When all units are connected operatively in series relation, the total voltage impressed across the direct current circuit 3 would, of course, be 40,000 volts. The frequency responsive device 91 at the receiving station controls the number of electric valve inverters which are operatively connected to the alternating current circuit 2 and thereby controls the amount of power transmitted to circuit 2. Let it be assumed initially that the system is operating at substantially 30,000 volts, that is, when power is being transmitted by rectifying units 4, 6 and 7. This condition of operation may be effected by operating switch 58 so that contact 59 is closed, thereby energizing switch 49 and effectively shunting the direct current terminals 8 and 9 of rectifying unit 5. Under such conditions of operation, the frequency responsive device 90 would operate so that inverting unit 62 at the receiving station is effectively short circuited by means of switch 92, and therefore, power would be transmitted from the direct current circuit 3 to the alternating current circuit 2 through inverting devices 61, 63 and 64. If it is desired to transmit a greater amount of power from circuit 1 to circuit 2, switch 58 may be operated so that contacts 59 and 60 are open, effectively connecting rectifying unit 5 in series relation with the other rectifier units. The direct current voltage will, of course, be increased correspondingly to 40,000 volts. Upon application of additional load to circuit 2, the frequency of circuit 2 will temporarily decrease and the frequency responsive circuit 90 will operate to put electric valve inverter 62 in operation so that the increased amount of power may be transmitted. Conversely, the frequency responsive circuit 90 will effect a decrease in the number of units connected if the power demand decreases. This action is brought about by the temporary rise in frequency of circuit 2 upon decrease in load. Of course, it is to be understood that the switch 58 may be made to operate in accordance with a predetermined controlling influence such as the power demanded by the direct current circuit 3.

The overload protection means 47 operates to move switches 48 to the right-hand position and to bias the electric valves 14 to a nonconductive condition when the current tends to exceed a safe operating value.

Power is transmitted to the alternating current circuit 2 at substantially constant voltage and frequency. The excitation of the synchronous machine 99, which may act as a synchronous condenser to supply variable amounts of reactive volt-amperes, is varied in accordance with the amount of power transmitted in order that the speed and the frequency of the machine shall remain within a predetermined range of values. The load compensating device 105 increases the energization of field winding 101 upon increase in load, thereby preventing an increase in the frequency of the system. The load compensating device 105 transmits a variable component of unidirectional current to the field winding 101 in addition to the substantially constant unidirectional component of current supplied to the field winding from circuit 102. I have found that this arrangement is very satisfactory for controlling the voltage and frequency in systems where an alternating current circuit is energized from a direct current transmission line and where the load connected to the circuit is of the static type, that is, devoid of other synchronous generating equipment.

An important feature of the embodiment of my invention shown in Figs. 1a–1d, is the manner in which the power flow is controlled by switching in and out certain polyphase groups of windings and the associated electric valve means. As stated above, transformers 25, 26, 73 and 74 are arranged to provide a twenty-four-phase system of voltages. At the transmitting station and the receiving station, transformers 25, 26 and 73, 74, respectively, provide four six-phase systems displaced in phase with respect to each other. These groups of windings, by operation of the associated electric valve means, are placed in operation and taken out of operation to control the power and the current transmitted. When all the units are connected, the system operates as a twenty-four-phase system and, of course, as the units are disconnected in succession, the system operates as an eighteen-phase or a twelve-phase system.

I have found that when the direct current transmission system of Figs. 1a–1d operates as a substantially constant voltage direct current system that it is important to maintain a predetermined relationship between the volt-ampere characteristics of the transmitter and the receiving units. From a practical operating point of view, there are two kinds of stability to consider in maintaining the system in operation. First, the system must have what is generally termed a relatively high steady state power limit so that the intended amount of load may be transmitted. Second, the system should be designed so that it remains in operation under transient disturbances, such as disturbances occasioned by valve failure, short circuits or instantaneous open circuits of part of the system.

I have found that there is a critical relationship between the volt-ampere characteristic of the transmitter and the volt-ampere characteristic of the receiver which determines whether or not the system will remain in operation during transient disturbances. This critical condition may be defined by saying that the receiver should be stiffer than the transmitter; that is, the change in the receiver voltage per unit of current should be less than the change in transmitter voltage per unit of current. This relationship may be expressed by stating that the slope of the volt-ampere characteristic of the inverter is less than the slope of the volt-ampere characteristic of the transmitter. Thus, if the system does not have the required stability under transient conditions, the remedy is to increase the effective impedance of the transmitter. It should be observed that this relationship is just the opposite to that which is desired in a synchronous alternating current transmission system where increased stability is obtained by increasing the stiffness of the transmitting unit. The reason for this difference is that the direct current transmission system employing rectifiers and inverters for transmitting power between alternating current circuits and direct current circuits involves an entirely different kind of stability than encountered in the operation of alternating current systems.

The manner in which that portion of my system including the transforming means 25 and 26 and transformers 73 and 74 transform three phase alternating current into twenty-four phase alternating current, or vice versa, will now be considered. Windings 27a′, 27b′ and 27c′ are connected with respect to the windings 27a, 27b and 27c to obtain a phase displacement of 7½ electrical degrees with respect to the vertical voltage axis of the three phase Y system of voltages of circuit 1. The voltages induced in windings 29 and 30 constitute in themselves a six phase system of voltages which cooperating with the twelve phase rectifying system comprising electric valve means 4 and 5 provide a twelve phase system. This twelve phase system, of course, comprises the rectifiers 4 and 5 which transmit current during both the positive and negative portions of the voltage waves produced by windings 29 and 30. A similar phase displacement of the voltages induced in windings 31 and 32 of transformer 26 is obtained by adding the desired components of voltages of the respective groups of primary windings of this transformer. For example, the upper secondary winding 31 of transformer 26 is displaced 7½ electrical degrees from the vertical voltage axis by adding the components of voltage derived from winding 28a and 28b′. Transformer 26 also provides a six phase system of voltages which is displaced with respect to the twelve phase system of voltages produced by transformer 25 by fifteen electrical degrees. The output of transformer 26 is fed to the twelve phase electric valve equipment comprising electric valve means 6 and 7 which operating in conjunction with the transformer 25 constitute a twelve phase system. The resultant twenty-four phase system of voltages obtained by combining the output voltages of transformers 25 and 26 and electric valve means 4—7 is a balanced twenty-four phase system.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination, a three phase alternating current circuit, a load circuit, and means for transforming three phase alternating current into twenty-four phase alternating current comprising two transforming means each having a group of star-connected secondary windings and a group of mesh-connected secondary windings connected to said load circuit and each having two groups of primary phase windings, one group of primary windings of each transforming means being connected in Y and means for connecting each of the windings of the other group of primary windings of each of said transforming means to a different electrically displaced winding of the associated said one group, the respective windings of the said other groups of said transforming means being connected in series relation with different combinations of phase windings of the said one groups to effect different phase displacements between the voltages induced in the star-connected and the mesh-connected secondary windings of the transforming means relative to the voltage of said alternating current circuit.

2. In combination, a three phase alternating current circuit, a load circuit, and means for transforming three phase alternating current into twenty-four phase alternating current comprising two transforming means each having a group of star-connected secondary windings and a group of mesh-connected secondary windings connected to said load circuit and each having two groups of primary phase windings, one group of primary windings of each of said transforming means being connected in Y and means for connecting each of the phase windings of the other group of primary windings of each of said transforming means to a different electrically displaced winding of the associated said one group, the serially connected windings including only two windings of the same phase and the respective windings of the said other group in each of said transforming means being connected in series relation with different combinations of phase windings of said one group to effect a phase displacement of fifteen electrical degrees between the voltages induced in the secondary windings of the transforming means.

3. In combination, a three phase alternating current circuit, a load circuit, and means for transforming three phase alternating current into twelve phase alternating current comprising a transforming means having a group of star-connected secondary windings and having a group of mesh-connected secondary windings and comprising two groups of primary phase windings, one group of primary phase windings being connected in Y and the other group of primary phase windings being connected in series relation with different combinations of phase windings of the said one group to effect different phase displacements between the voltages induced in the star-connected and the mesh-connected secondary windings of the transforming means relative to the voltage of said alternating current circuit.

4. In combination, a three phase alternating current circuit comprising three phase conductors, a load circuit, and means for transforming three phase alternating current into twenty-four phase alternating current comprising two transforming means each having a group of star-connected secondary windings and a group of mesh-connected secondary windings connected to said load circuit and each having two groups of primary phase windings, one group of primary phase windings of each transforming means being connected in Y and means for connecting the windings of the other group of primary windings of each of said transforming means to a different electrically displaced winding of the associated said one group, the respective windings of said other groups of said transforming means being connected in series relation with different combinations of phase windings of said one groups to effect a phase displacement between the voltages induced in the star-connected and mesh-connected secondary windings of said transforming means, the groups of primary windings of the two transforming means being connected with respect to the phase conductors of said alternating current circuit to produce two twelve phase systems of voltage displaced by fifteen electrical degrees.

ERNST F. W. ALEXANDERSON.